G. W. Robbins,
Bed Bottom,
Nº 67,585.   Patented Aug. 6, 1867.
Fig: 1.
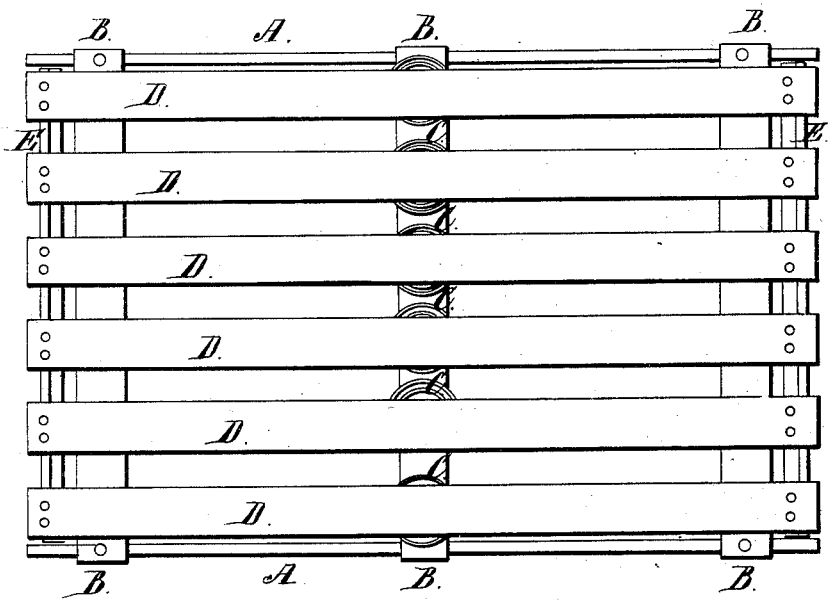
Fig: 2.
Witnesses:
P. T. Dodge
Geo. H. Griebel
Inventor:
G. W. Robbins
by Dodge & Munn
his attys

United States Patent Office

GEORGE W. ROBBINS, OF FOND DU LAC, WISCONSIN.

Letters Patent No. 67,585, dated August 6, 1867.

IMPROVED BED-BOTTOM.

*The Schedule referred to in these Letters Patent and making part of the same.*

TO ALL WHOM IT MAY CONCERN:

Be it known that I, GEORGE W. ROBBINS, of Fond du Lac, in the county of Fond du Lac, and State of Wisconsin, have invented certain new and useful Improvements in Bed-Bottoms; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to spring-bottoms for beds, and consists of a novel arrangement for making them spring evenly. In the drawings—

Figure 1 is a top plan view, and

Figure 2 is a longitudinal vertical section on the line $x\,x$ of fig. 1.

I construct my bed-bottom of a frame sufficiently strong for the purpose, and consisting of two side pieces A and three cross-pieces B, as shown in fig. 1. On the middle cross-piece B, I place at equal distances spiral springs C, and on each one of the springs C, I place a slat, D, with its centre on the spring C, and running longitudinally. I connect the ends of each of the slats D to the cross-pieces E by means of the C-springs F, as shown in fig. 2. The cross-pieces F, I rest upon and fasten to the ends of the boards G, which are fastened at their centres to the cross-piece B on its under side. The boards G may be strengthened, and the spring of their ends upon which the cross-pieces E rest may be stiffened, by means of the small board $a$ fastened to them, as shown in fig. 2.

It will be noticed that whenever any weight bears upon the slats D, it is borne equally by all the springs, and the slats and springs take the position shown by the red lines in fig. 2. By this construction and arrangement I am enabled to make a bed-bottom having a uniform elasticity over its whole surface, and at the same time simple, cheap, and durable.

Having thus described my invention, what I claim is—

A bed-bottom consisting of the spiral springs C, slats D, C-springs F, and spring-boards G, when arranged to operate as described and for the purpose set forth.

GEORGE W. ROBBINS.

Witnesses:
H. M. HAMILTON,
L. G. M. ALGUTT.